(12) United States Patent
Mukherjee et al.

(10) Patent No.: US 10,362,332 B2
(45) Date of Patent: Jul. 23, 2019

(54) MULTI-LEVEL COMPOUND PREDICTION

(71) Applicant: Google Inc., Mountain View, CA (US)

(72) Inventors: Debargha Mukherjee, Cupertino, CA (US); Yaowu Xu, Saratoga, CA (US); James Bankoski, Los Gatos, CA (US); Yuxin Liu, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 108 days.

(21) Appl. No.: 15/458,403

(22) Filed: Mar. 14, 2017

(65) Prior Publication Data

US 2018/0270502 A1 Sep. 20, 2018

(51) Int. Cl.
| | |
|---|---|
| *H04N 19/53* | (2014.01) |
| *H04N 19/513* | (2014.01) |
| *H04N 19/105* | (2014.01) |
| *H04N 19/11* | (2014.01) |
| *H04N 19/109* | (2014.01) |
| *H04N 19/573* | (2014.01) |

(52) U.S. Cl.
CPC .......... *H04N 19/53* (2014.11); *H04N 19/105* (2014.11); *H04N 19/109* (2014.11); *H04N 19/11* (2014.11); *H04N 19/513* (2014.11); *H04N 19/573* (2014.11)

(58) Field of Classification Search
CPC ...... H04N 19/53; H04N 19/513; H04N 19/50; H04N 19/107; H04N 19/573; H04N 19/56; H04N 19/132; H04N 19/00569; H04N 19/00884; H04N 19/70; H04N 19/91; H04N 19/11; H04N 19/136; H04N 19/159; H04N 19/176; H04N 19/186; H04N 19/1887; H04N 19/44; H04N 19/463; H04N 19/593
See application file for complete search history.

(56) References Cited

U.S. PATENT DOCUMENTS

| | | | |
|---|---|---|---|
| 8,737,824 B1* | 5/2014 | Bultje | H04N 5/765 386/353 |
| 9,531,990 B1* | 12/2016 | Wilkins | H04N 7/00 |
| 9,609,343 B1* | 3/2017 | Chen | H04N 19/107 |
| 9,813,700 B1* | 11/2017 | Bultje | H04N 5/765 |
| 2007/0152908 A1* | 7/2007 | Khan | H04N 19/43 345/16 |

(Continued)

OTHER PUBLICATIONS

Mukherjee, et al., "The latest open-source video codec VP9—An overview and preliminary results," 2013 Picture Coding Symposium (PCS), IEEE, Dec. 8, 2013, pp. 390-393.

(Continued)

*Primary Examiner* — Dramos Kalapodas
(74) *Attorney, Agent, or Firm* — Young Basile Hanlon & MacFarlane, P.C.

(57) ABSTRACT

Coding a current block using multi-level compound predictor is disclosed. A method includes generating a first compound predictor by combining at least two predictor blocks for the current block, generating a second predictor for the current block, and combining the first compound predictor and the second predictor to obtain a prediction block for encoding or decoding the current block. An indicator may be sent from the encoder to the decoder to indicate when multi-level compound prediction is used to encode a block.

18 Claims, 13 Drawing Sheets

(56) References Cited

U.S. PATENT DOCUMENTS

| | | | | |
|---|---|---|---|---|
| 2009/0238276 A1* | 9/2009 | Har-Noy | ............... | H04N 19/105 375/240.13 |
| 2009/0257492 A1* | 10/2009 | Andersson | ........... | H04N 19/105 375/240.12 |
| 2010/0322429 A1* | 12/2010 | Norvell | ................. | G10L 19/008 381/22 |
| 2011/0261882 A1* | 10/2011 | Zheng | ................... | H04N 19/105 375/240.13 |
| 2014/0086323 A1* | 3/2014 | Chuang | ................ | H04N 19/159 375/240.12 |
| 2016/0100188 A1* | 4/2016 | Chuang | ................ | H04N 19/105 375/240.16 |
| 2017/0006284 A1* | 1/2017 | Gokhale | ................ | H04N 19/61 |

OTHER PUBLICATIONS

International Search Report and Written Opinion in PCT/US2017/059293, dated Jan. 18, 2018.

* cited by examiner

US 10,362,332 B2

MULTI-LEVEL COMPOUND PREDICTION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using multi-level compound prediction.

One aspect of the disclosed implementations is a method for coding a current block. The method includes generating a first compound predictor by combining at least two predictor blocks for the current block, generating a second predictor for the current block, and combining the first compound predictor and the second predictor to obtain a prediction block for coding the current block. Coding the current block can include encoding or decoding the current block.

Another aspect is an apparatus, including a memory and a processor, for encoding a current block according to one implementation of this disclosure. The processor is configured to execute instructions stored in the memory to generate a first compound predictor by combining at least two predictor blocks for the current block, generate a second predictor for the current block, and combine the first compound predictor and the second predictor to obtain a prediction block for encoding the current block.

Another aspect is an apparatus, including a memory and a processor, for decoding a current block according to one implementation. The processor is configured to execute instructions stored in the memory to decode, from an encoded bitstream, an indicator that identifies that multi-level compound prediction was used to encode the current block, generate a first compound predictor by combining at least two predictor blocks for the current block, generate a second predictor for the current block, and combine the first compound predictor and the second predictor to obtain a prediction block for decoding the current block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
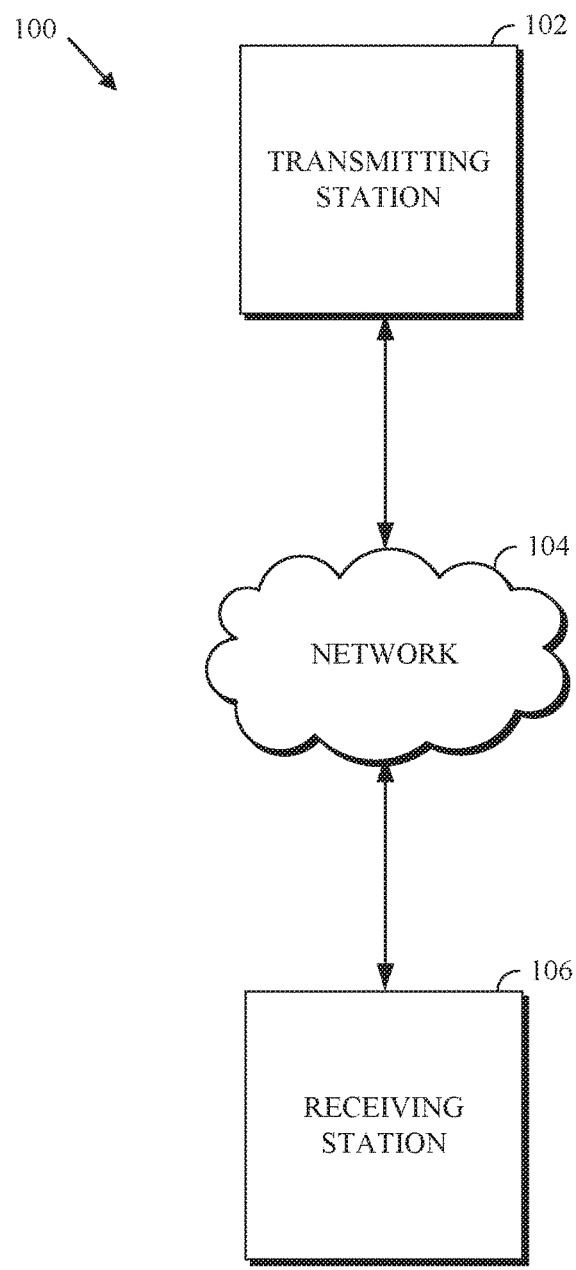
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction can attempt to predict the pixel values of a block of a frame of a video stream using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder.

Encoding using temporal similarities can be known as inter prediction. Inter prediction can attempt to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be combination of a first predictor and a second predictor which can be two intra predictors (i.e., intra+intra), an intra predictor and an inter predictor (i.e., intra+inter) or two inter predictors (i.e., inter+inter). For example, in the case of inter+inter, compound inter prediction can employ a first motion vector to obtain a predictor from a first reference frame, and a second motion vector to obtain a predictor from a second reference frame. The reference frames can both be in the past, both in the future, or some combination thereof. The second motion vector can be independent of, or derived from, the first motion vector. As another example, and in the case of intra-inter, compound prediction can employ a first predictor generated by an intra prediction operation and a second predictor generated by an inter prediction operation.

In forming the compound predictor, an encoder can perform averaging, a weighted combination, a filtering operation, or a more complex form of estimating the significance of the value of each predictor, e.g., on a per-pixel basis to generate pixel values for the combined predictor using pixels of the two individual predictors. Accordingly, combining predictors can result in a compound predictor that can be an average of the two values or a weighted average that estimates the significance of the value of each predictor, for example.

A motion vector can be selected from a reference motion vector list of candidate reference motion vectors. The candidate reference motion vectors can include motion vectors from any previously coded (or decoded) blocks in the video stream, such as a block from a previously coded (or decoded) frame, or a block from the same frame that has been previously encoded (or decoded). The candidate reference motion vectors can be obtained from a co-located block (of the current block) and its surrounding blocks in a reference frame. For example, the surrounding blocks can include a block to the right, bottom-left, bottom-right of, or below the co-located block. In the case of non-compound inter prediction (i.e., single inter prediction), the candidate reference motion vectors for a block can include, for at least some reference frames, a single predictor motion vector per reference frame that can be the best motion vector for that reference frame. In the case of compound inter prediction, pairs of reference frames can be evaluated to determine a best motion vector(s) per pair of reference frames. The best motion vector(s) per pair can be included in a reference motion vector list.

In either case (i.e., intra, inter, or compound prediction), a prediction block is generated and can be subtracted from the block to be encoded to form the residual block representing the difference between the blocks.

Implementations of this disclosure can improve motion prediction via multi-level compound prediction. Using multi-level compound prediction, new kinds of compound predictors can be created. Multi-level compound prediction provides more candidate predictors for the coding of a block or a region of video. For example, motion prediction using multi-level compound prediction can better adapt to the specific motion and content varieties of the block to be encoded, resulting in compression improvements. Whereas some video codecs may use a maximum of two of the reference frames of the reference frame buffer, multi-level compound prediction can more effectively leverage the reference frames to identify an improved prediction block by generating additional candidate reference motion vectors using additional combinations of the reference frames. Compression performance can be improved while a reasonable level of encoder and decoder complexity is maintained.

Details are described herein after first describing an environment in which the multi-level compound prediction disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
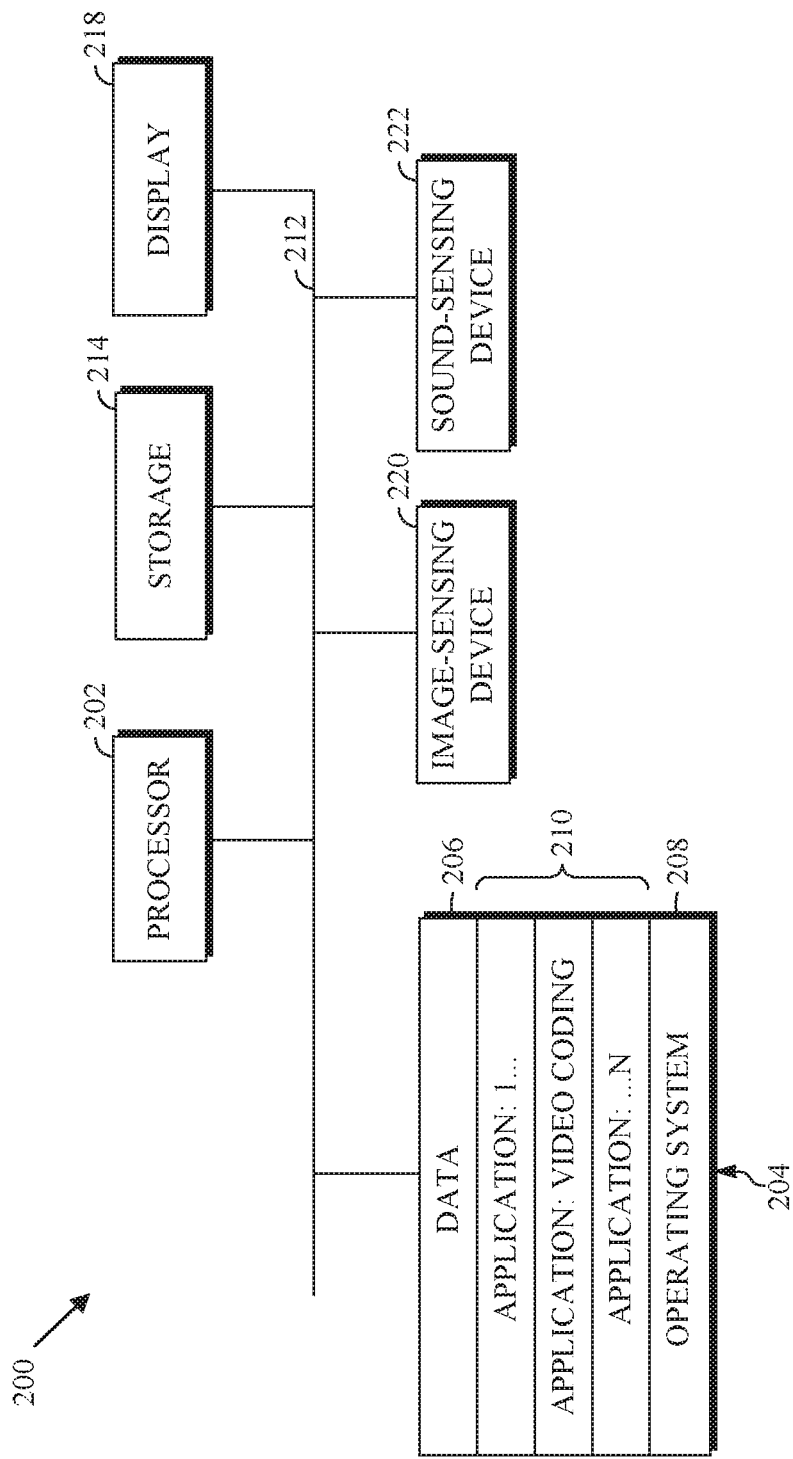
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
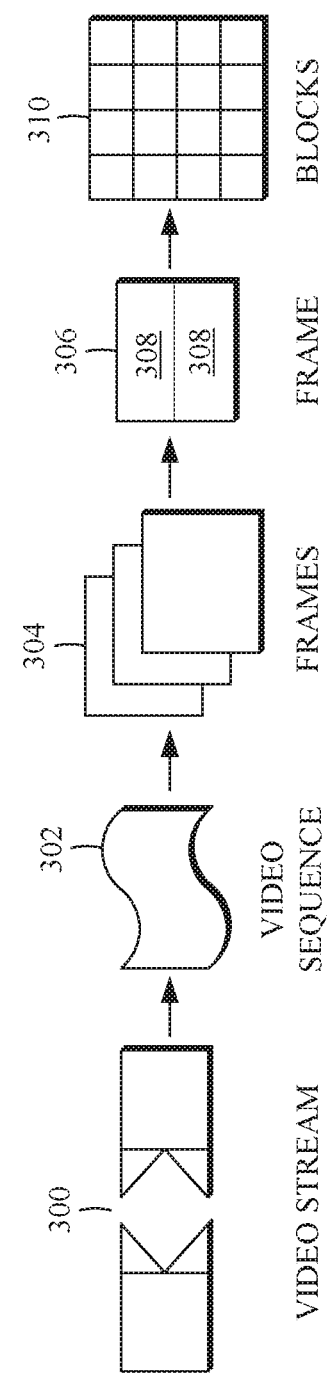
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
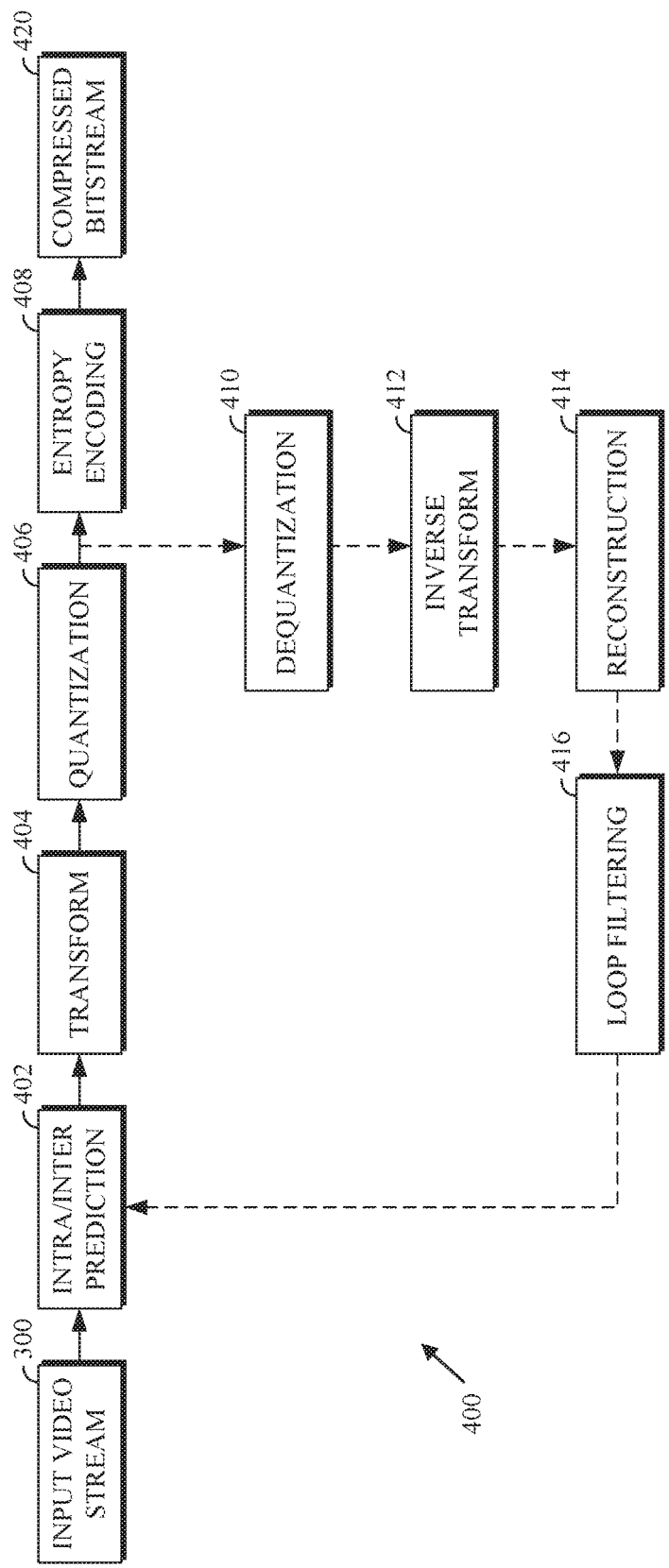
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
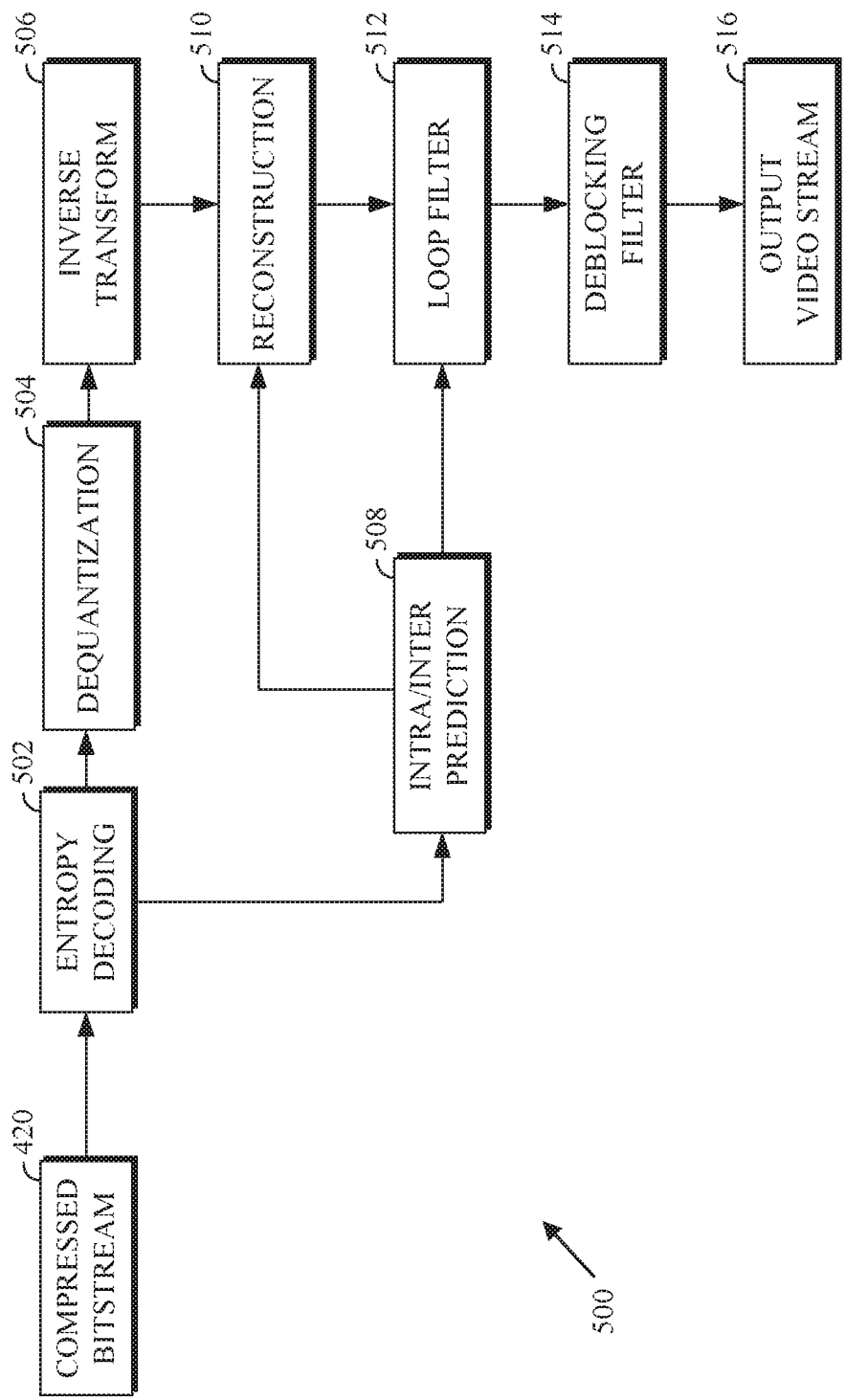
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
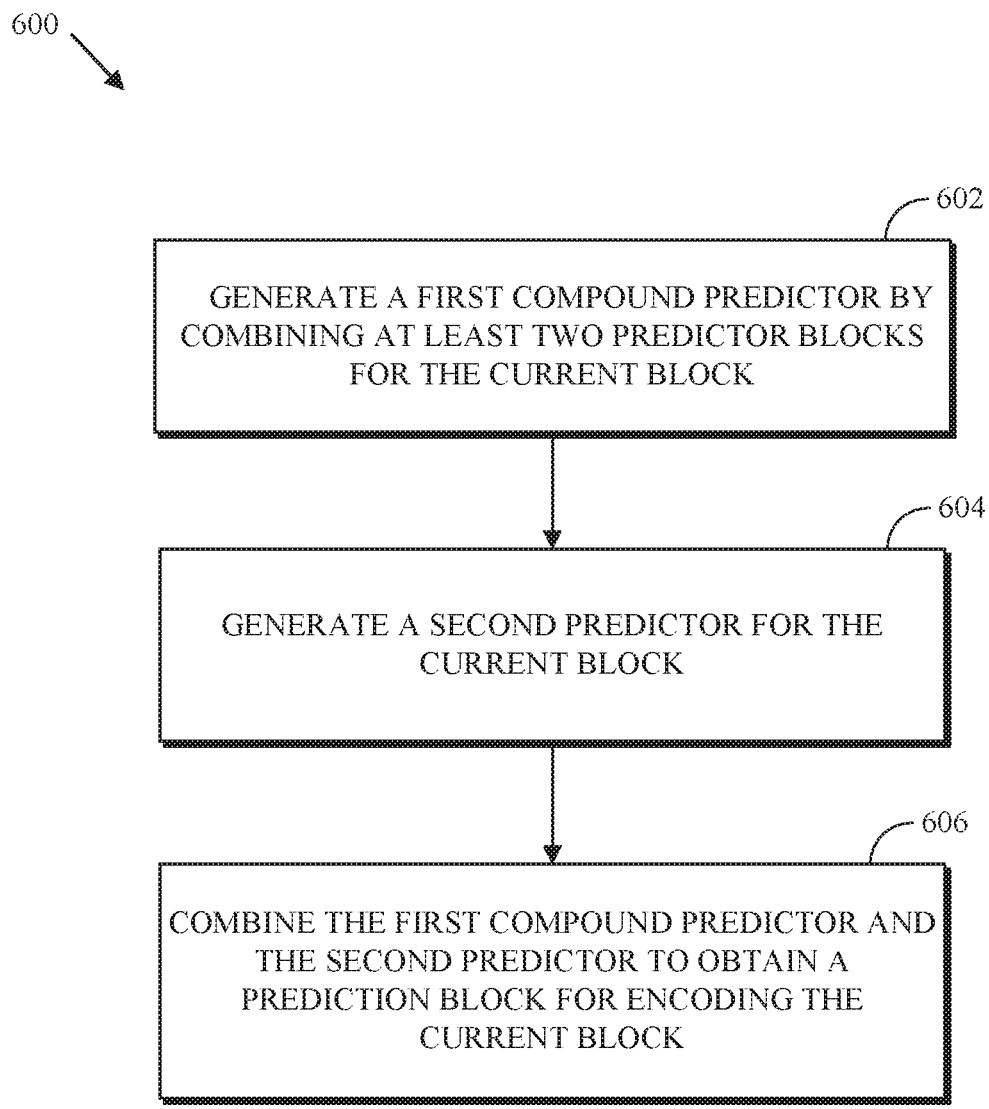
FIG. 6 is a flowchart diagram of a process for encoding a current block using multi-level compound prediction according to an implementation of this disclosure.

FIG. 6 is a flowchart diagram of a process 600 for encoding a current block using multi-level compound prediction according to an implementation of this disclosure. The process 600 can be implemented in an encoder such as the encoder 400 of FIG. 4.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 of FIG. 4.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Figure 7:
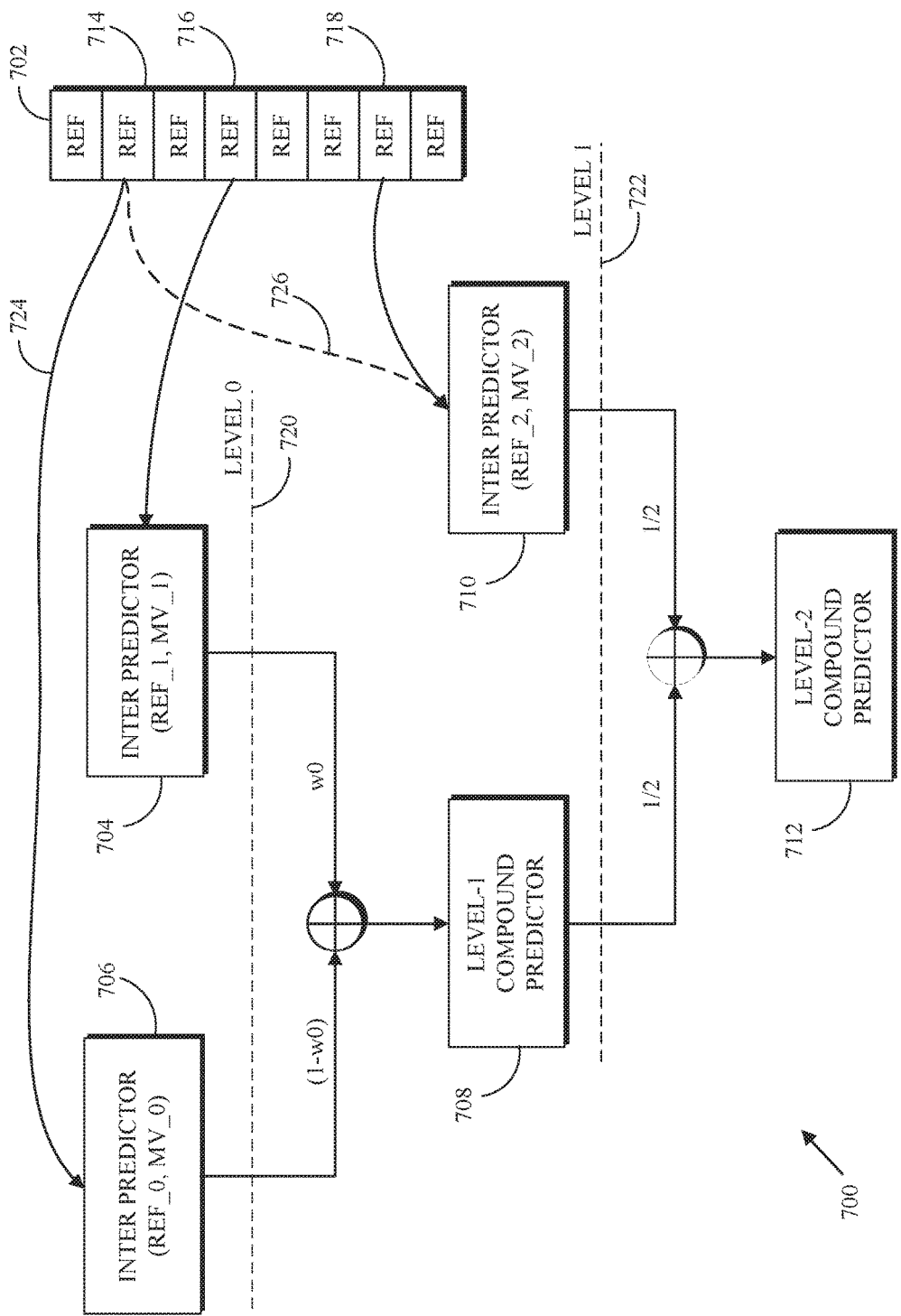
FIG. 7 is a diagram of an inter tri-prediction according to implementations of this disclosure.

At 602, the process 600 generates a first compound predictor by combining at least two predictor blocks for the current block. The predictor blocks that form a compound predictor may be referred to herein as constituent predictors or constituent blocks. In the examples described herein, each of the first constituent predictor and the second constituent predictor is generated using intra or inter prediction as explained above with regard to the encoder 400. At 604, the process 600 generates a second predictor also using intra or inter prediction. At 606, the process 600 combines the first compound predictor and the second predictor to obtain the prediction block. The process 600 is described further with reference to the non-limiting examples of FIGS. 7 and 9-12. In FIGS. 7 and 9-12, (REF_x, MV_x) indicates, respectively, a reference frame and a motion vector of a corresponding inter predictor (i.e., an prediction block generated by an inter prediction operation). For example, inter predictor 706 of FIG. 7 is indicated as using (or referring to) a reference frame REF_0 and a motion vector MV_0. Reference frames are described below with respect to FIG. 8.

FIG. 7 is a diagram 700 of an inter tri-prediction according to implementations of this disclosure. FIG. 7 illustrates a two-level compound prediction that results in a prediction block at level two. At level 0, indicated by line 720, the process 600 generates, at 602, at least two predictor blocks, namely an inter predictor 704 and the inter predictor 706 in this example. The process 600 generates the inter predictor 704 using reference frame 716 of a reference frame buffer 702 and generates the inter predictor 706 using the reference frame 714. The process 600 combines the inter predictor 706 and the inter predictor 704 to generate a first compound predictor block, namely a level-1 compound predictor 708.

At level 1, indicated by line 722, the process 600, via 604, generates an inter predictor 710 (i.e., the second predictor). In this case, the second predictor is an inter predictor, i.e., is generated using inter prediction. However, the second predictor can be generated using intra prediction. The process 600 generates the inter predictor 710 using a reference frame 718 of the reference frame buffer 702. At 606, the process 600 combines the level-1 compound predictor 708 (i.e., the first compound predictor) and the inter predictor 710 (i.e., the second predictor) to obtain a level-2 compound predictor 712. The level-2 compound predictor 712 constitutes the prediction block of the current block.

In some examples, the compound predictor at level 1 or level 2, or both, is generated as a weighted combination of pixels of the two separate predictors. The two separate predictors can conform to the dimension of the current block such that the combination is performed on a pixel-by-pixel basis for co-located pixels. The weighting of the predictors can be determined in a variety of ways. For example, the weights of the two predictors can be, respectively, w0 and (1−w0) where w0 is a value between zero and one. In some implementations, the weight w0 can be ½ and the weight (1−w0) can be ½, resulting in averaging of the pixels of each of the two predictors. Other values for the weight w0 are possible. For example, the weight w0 can be a number between 0 and 16. The weighting at the different levels can be the same or different.

As another example, wedge-based compound prediction can be used. In wedge-based compound prediction, flexible weights can be adapted to the textures and pixel positions of the current block. Wedge-based compound prediction can partition the current block into two or more partitions based on one or more partition lines that can be straight or oblique (i.e., not straight). A codebook of available partition lines can be used. Wedge-based compound prediction can partition the current block based on the codebook of available partition lines. Each partition of the block can be separately predicted (i.e., can have a separate predictor block) using inter and/or intra prediction. The separate predictor blocks can be combined to form the compound predictor block having the same dimensions as the current block being predicted according to the partition line(s).

In the case of one partition line, the current block is divided into two partitions. Each partition of the current block can be separately inter or intra predicted to generate a first predictor block and a second predictor block. The compound predictor can be a smooth-weighted or a cliff-weighted combination of the first predictor block and the second predictor block.

A compound predictor that is a smooth-weighted compound predictor can have weights that vary relatively smoothly across the compound prediction block or can have constant weights (i.e., weights that do not vary). A cliff-weighted compound predictor block, in contrast, can vary the weights sharply from the first predictor block to the second predictor block with a transition region that can be narrow compared to the size of the current block. The codebook can include one or more transition regions and the weights to apply to the first predictor block and the second predictor block.

Figure 8:
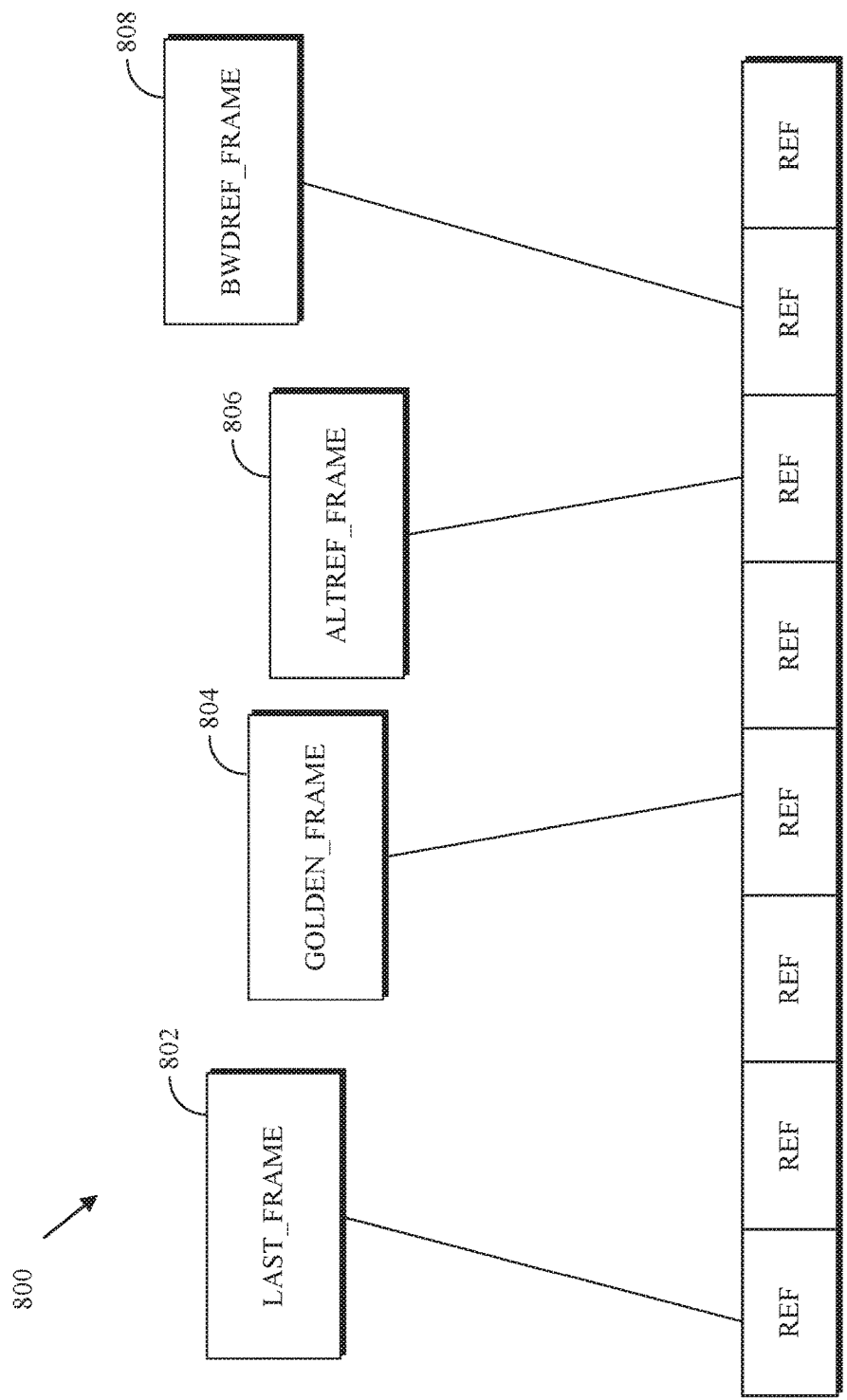
FIG. 8 is a diagram of an example of a reference frame buffer according to implementations of this disclosure.

FIG. 8 is a diagram of an example of a reference frame buffer 800 according to implementations of this disclosure. As described above with respect to inter prediction, a motion vector used to generate a prediction block refers to (i.e., uses) a reference frame. Reference frames can be stored in a reference frame buffer, such as the reference frame buffer 800.

A current frame, or a current block or region of a frame, can be encoded using a reference frame such as a "last frame," which is the adjacent frame immediately before the current frame in the video sequence. When video frames are encoded out of order (i.e., not in the sequence that they appear in the video stream), motion information from video frames in the past or future can be included in the candidate reference motion vectors. Encoding video frames can occur, for example, using so-called "alternate reference frames" that are not temporally neighboring to the frames coded immediately before or after them. An alternate reference frame can be a synthesized frame that does not occur in the input video stream or is a duplicate frame to one in the input video stream that is used for prediction. An alternate frame may not be displayed following decoding. Such a frame can resemble a video frame in the non-adjacent future. Another example in which out of order encoding may occur is through the use of a so-called "golden frame," which is a reconstructed video frame that may or may not be neighboring to a current frame and is stored in memory for use as a reference frame until replaced, e.g., by a new golden frame.

The reference frame buffer stores reference frames used to encode or decode blocks of frames of a video sequence. The reference frame buffer can include reference frames such as those described above. For example, the reference frame buffer 800 can include a last frame LAST_FRAME 802, a golden frame GOLDEN_FRAME 804, and an alternative reference frame ALTREF_FRAME 806. A reference frame buffer can include more, fewer, or other reference frames. The reference frame buffer 800 is shown as including eight reference frames. However, a reference frame buffer can include more or fewer than eight reference frames.

The last frame LAST_FRAME 802 can be, for example, the adjacent frame immediately before the current frame in the video sequence. The golden frame GOLDEN_FRAME 804 can be, for example, a reconstructed video frame for use as a reference frame that may or may not be adjacent to the current frame. The alternative reference frame ALTREF_FRAME 806 can be, for example, a video frame in the non-adjacent future, which is a backward reference frame.

The reference frames stored in the reference frame buffer 800 can be used to identify motion vectors for predicting blocks of frames to be encoded or decoded. Different reference frames may be used depending on the type of prediction used to predict a current block of a current frame. For example, when compound prediction is used, multiple frames, such as one for forward prediction (e.g., LAST_FRAME 802 or GOLDEN_FRAME 804) and one for backward prediction (e.g., ALTREF_FRAME 806) can be used for predicting the current block.

There may be a finite number of reference frames that can be stored within the reference frame buffer 800. As shown in FIG. 8, the reference frame buffer 800 can store up to eight reference frames. Although three of the eight spaces in the reference frame buffer 800 are used by the LAST_FRAME 802, the GOLDEN_FRAME 804, and the ALTREF_FRAME 806, five spaces remain available to store other reference frames.

In particular, one or more available spaces in the reference frame buffer 800 may be used to store a second last frame LAST2_FRAME and/or a third last frame LAST3_FRAME as additional forward reference frames, in addition to the LAST_FRAME 802. A backward frame BWDREF_FRAME 808 can be stored as an additional backward prediction reference frame, in addition to ALTREF_FRAME 806. The BWDREF_FRAME can be closer in relative distance to the current frame than the ALTREF_FRAME 806, for example.

In one example, the pair of {LAST_FRAME, BWDREF_FRAME} can be used to generate a compound predictor for coding the current block. In this example, LAST_FRAME is a "nearest" forward reference frame for forward prediction, and BWDREF_FRAME is a "nearest" backward reference frame for backward prediction.

A current block is predicted based on a prediction mode. The prediction mode may be selected from one of multiple intra-prediction modes. In the case of inter prediction, the prediction mode may be selected from one of multiple inter-prediction modes using one or more reference frames of the reference frame buffer 800 including, for example, the LAST_FRAME 802, the GOLDEN_FRAME 804, the ALTREF_FRAME 806, or any other reference frame. The prediction mode of the current block can be transmitted from an encoder, such as the encoder 400 of FIG. 4, to a decoder, such as the decoder 500 of FIG. 5, in an encoded bitstream, such as the compressed bitstream 420 of FIGS. 4-5. A bitstream syntax can support three categories of inter prediction modes in an example. These inter prediction modes can include a mode (referred to herein as the ZERO_MV mode) in which a block from the same location within a reference frame as the current block is used as the prediction block, a mode (referred to herein as the NEW_MV mode) in which a motion vector is transmitted to indicate the location of a block within a reference frame to be used as the prediction block relative to the current block, or a mode (referred to herein as the REF_MV mode and comprising a NEAR_MV or NEAREST_MV mode) in which no motion vector is transmitted and the current block uses the last or second-to-last non-zero motion vector used by neighboring, previously coded blocks to generate the prediction block. The previously coded blocks may be those coded in the scan order, e.g., a raster or other scan order, before the current block. Inter-prediction modes may be used with any of the available reference frames. NEAREST_MV and NEAR_MV can refer to the most and second most likely motion vectors for the current block obtained by a survey of motion vectors in the context for a reference. The reference can be a causal neighborhood in current frame. The reference can be co-located motion vectors in the previous frame.

Figure 9:
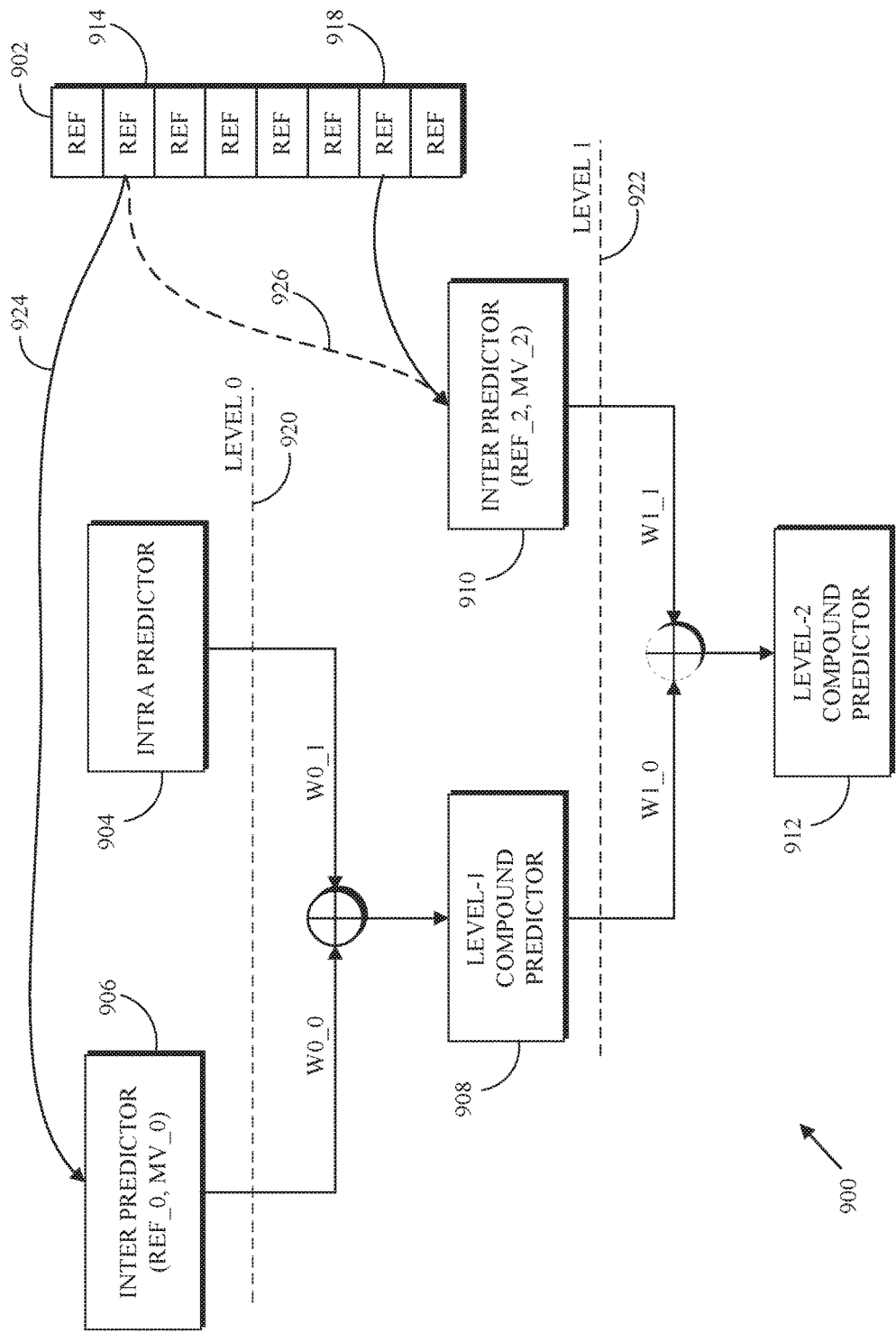
FIG. 9 is a diagram of an inter-intra tri-prediction according to implementations of this disclosure.

FIG. 9 is a diagram 900 of an inter-intra tri-prediction according to implementations of this disclosure. FIG. 9 illustrates another example of a two-level compound prediction. At level 0, indicated by line 920, the process 600 generates, at 602, at least two predictor blocks, namely an intra predictor 904 and an inter predictor 906 in this example. The process 600 generates the inter predictor 906 using a reference frame 916 of a reference frame buffer 902. The reference frame buffer 902 can be the reference frame buffer 800 of FIG. 8. The process 600 combines the inter predictor 906 and the intra predictor 904 to generate a first compound predictor, namely a level-1 compound predictor 908.

At level 1, indicated by line 922, the process 600, at 604, generates an inter predictor 910 (i.e., the second predictor). In this example, like that in FIG. 7, the second predictor is an inter predictor. However, the second predictor can be an intra predictor. The process 600 generates the inter predictor 910 using a reference frame 918 of the reference frame buffer 902. At 606, the process 600 combines the level-1 compound predictor 908 (i.e., the first compound predictor) and the inter predictor 910 (i.e., the second predictor) to obtain a level-2 compound predictor 912. The level-2 compound predictor 912 constitutes the prediction block of the current block.

The process 600 can combine the inter predictor 906 and intra predictor 904 as described with respect to FIG. 7. In the illustrated example, the weights w0_0, w0_1 are used for the inter predictor 906 and intra predictor 904, respectively. The process 600 can combine the level-1 compound predictor 908 and the inter predictor 910 as described with respect to FIG. 7. In the illustrated example, the weights w1_0, w1_1 are used for the level-1 compound predictor 908 and the inter predictor 910, respectively. The weights w0_0, w0_1 can be the same or different from the w1_0, w1_1. Note that a different technique may be used to combine the predictors at level 0 from that used to combine the predictors at level 1 in this or the other embodiments.

Figure 10:
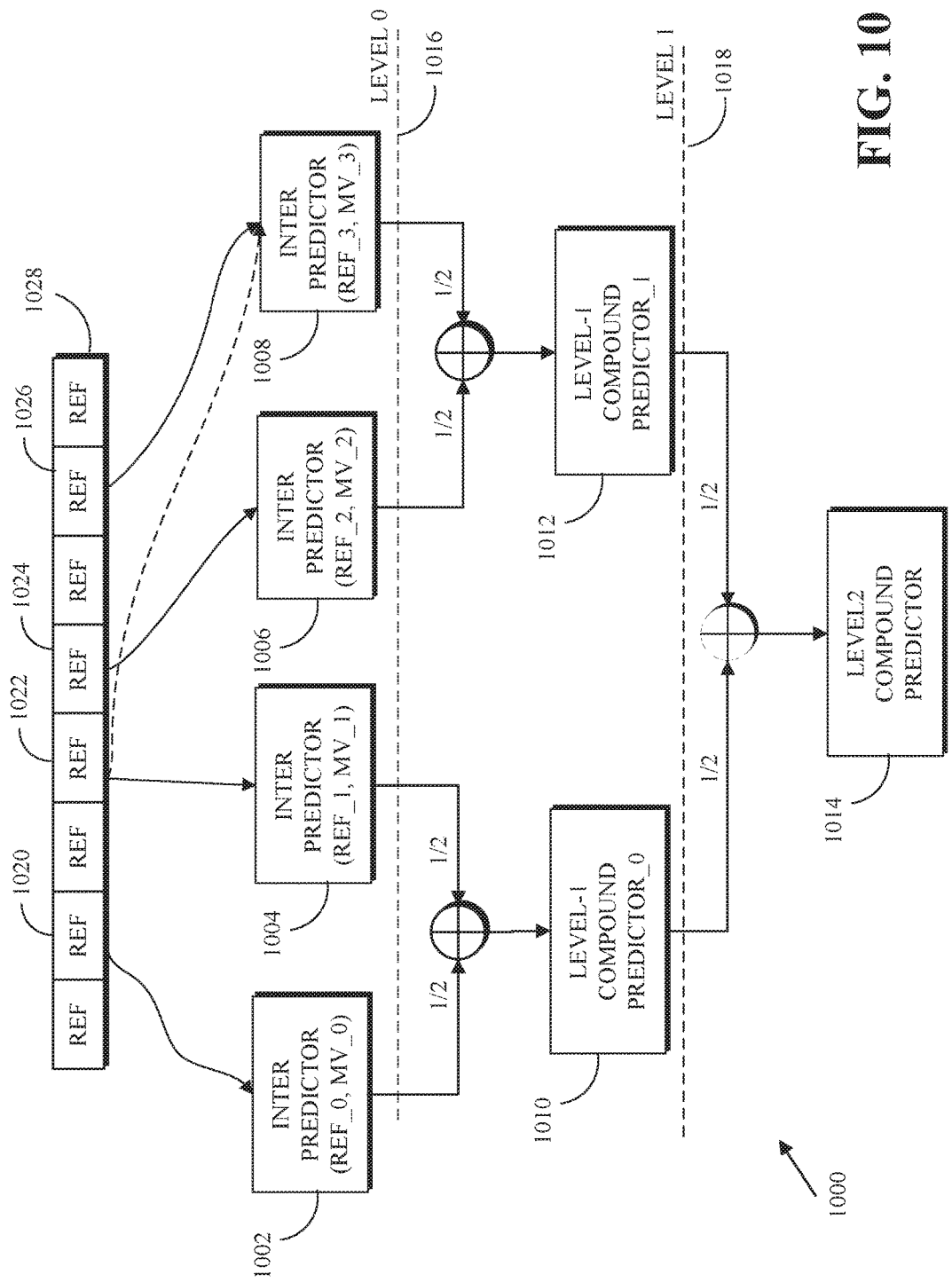
FIG. 10 is a diagram of an inter quad-prediction according to implementations of this disclosure.

FIG. 10 is a diagram 1000 of an inter quad-prediction according to implementations of this disclosure. FIG. 10 illustrates another example of a two-level compound prediction. At level 0, indicated by line 1016, the process 600 generates, at 602, at least two predictor blocks, namely an inter predictor 1002 and an inter predictor 1004. The process 600 generates the inter predictor 1002 using reference frame 1020 of a reference frame buffer 1028 and generates the inter predictor 1004 using the reference frame 1022. The reference frame buffer 1028 can be the reference frame buffer 800 of FIG. 8. The process 600 combines (e.g., using weights 1/2 and 1/2) the inter predictor 1002 and the inter predictor 1004 to generate a first compound predictor, namely a level-1 compound predictor_0 1010.

At 604, the process 600 generates a second predictor block. In FIG. 10, the process 600 generates the second compound predictor by combining at least two other predictor blocks for the current block. Namely, the second predictor is a level-1 compound predictor-1 1012, which is a combination (e.g., using weights 1/2 and 1/2) of an inter predictor 1006 (generated using a reference frame 1024) and an inter predictor 1008 (generated using a reference frame 1026). Alternatively, one or both of the same predictor blocks may be used. They may be combined using a different technique to generate the level-1 compound predictor_1 1012.

At 606, the process 600 combines (e.g., using weights 1/2 and 1/2) the level-1 compound predictor_0 1010 (i.e., the first compound predictor) and the level-1 compound predictor_1 1012 (i.e., the second predictor) to obtain a level-2 compound predictor 1014. The level-2 compound predictor 1014 constitutes the prediction block of the current block.

Figure 11:
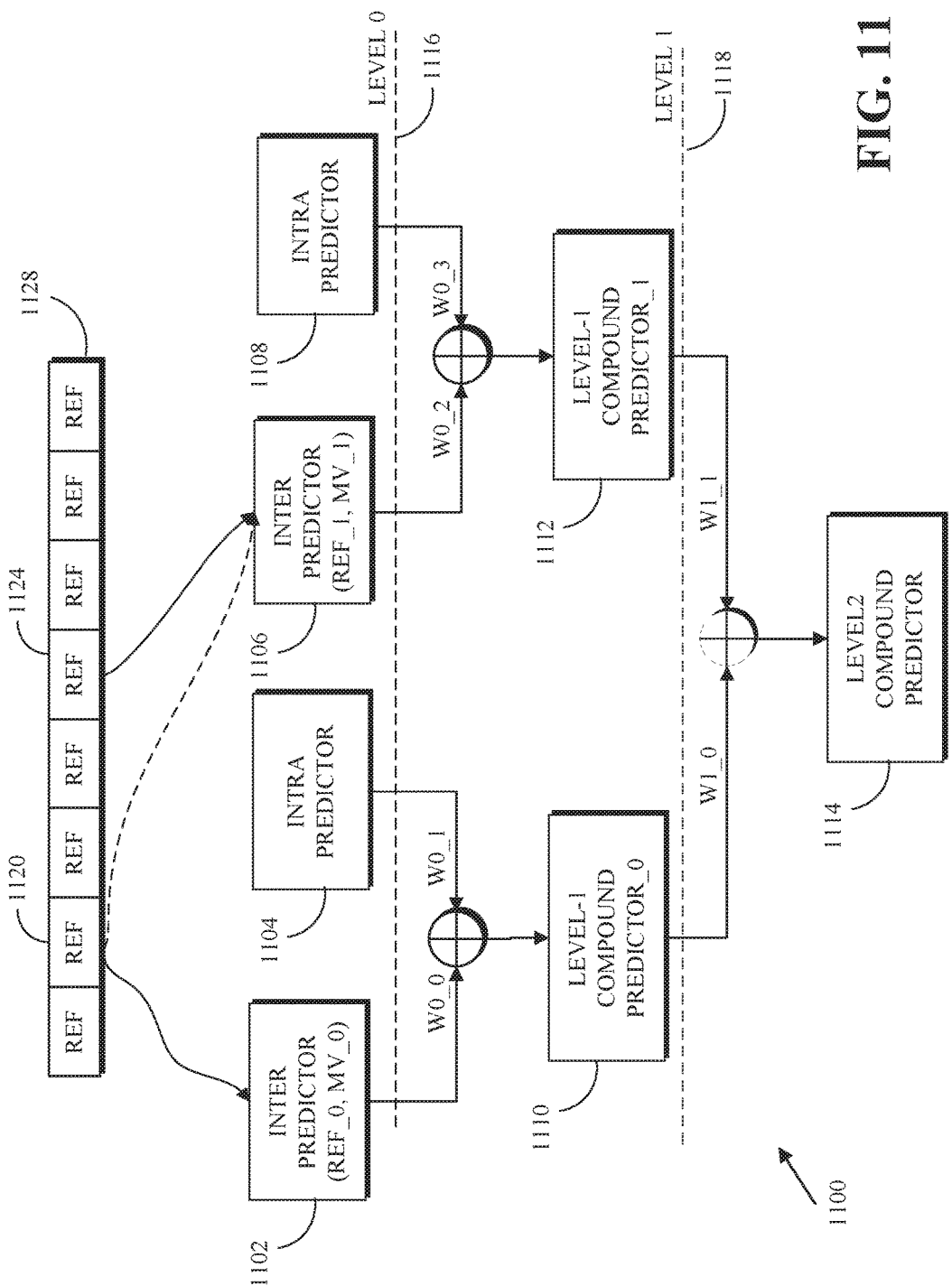
FIG. 11 is a diagram of an inter-intra quad-prediction according to implementations of this disclosure.

FIG. 11 is a diagram 1100 of an inter-intra quad-prediction according to implementations of this disclosure. FIG. 11 illustrates another example of a two-level compound prediction. At level 0, indicated by line 1116, the process 600 generates, at 602, at least two predictor blocks, namely an inter predictor 1102 and an intra predictor 1104. The process 600 generates the inter predictor 1102 using reference frame 1120 of a reference frame buffer 1128 in this example. The reference frame buffer 1128 can be the reference frame buffer 800 of FIG. 8. The process 600 combines (e.g., using weights W0_0 and W0_1) the inter predictor 1102 and the intra predictor 1104 to generate a first compound predictor block, namely a level-1 compound predictor_0 1110.

At 604, the process 600 generates a second predictor block. In FIG. 11, the second predictor block is a compound predictor; namely, the second predictor is a level-1 compound predictor-1 1112, which is a combination (e.g., using the weights W0_2 and W0_3), of at least two other predictor blocks, an inter predictor 1106 (generated using a reference frame 1124) and an intra predictor 1108. Alternatively, one or both of the same predictor blocks may be used. They may be combined using a different technique to generate the level-1 compound predictor_1 1112. The weights W0_0 and W0_1 and the weights W0_2 and W0_3 may be the same or different.

At 606, the process 600 combines the level-1 compound predictor_0 1110 (i.e., the first compound predictor) and the level-1 compound predictor_1 1112 (i.e., the second predictor) to obtain a level-2 compound predictor 1114. The level-2 compound predictor 1114 constitutes the prediction block of the current block. In this example, weights W1_0 and W1_1 are used, which may be the same or different from the weights W0_0 and W0_1 and/or the weights W0_2 and W0_3.

Figure 12:
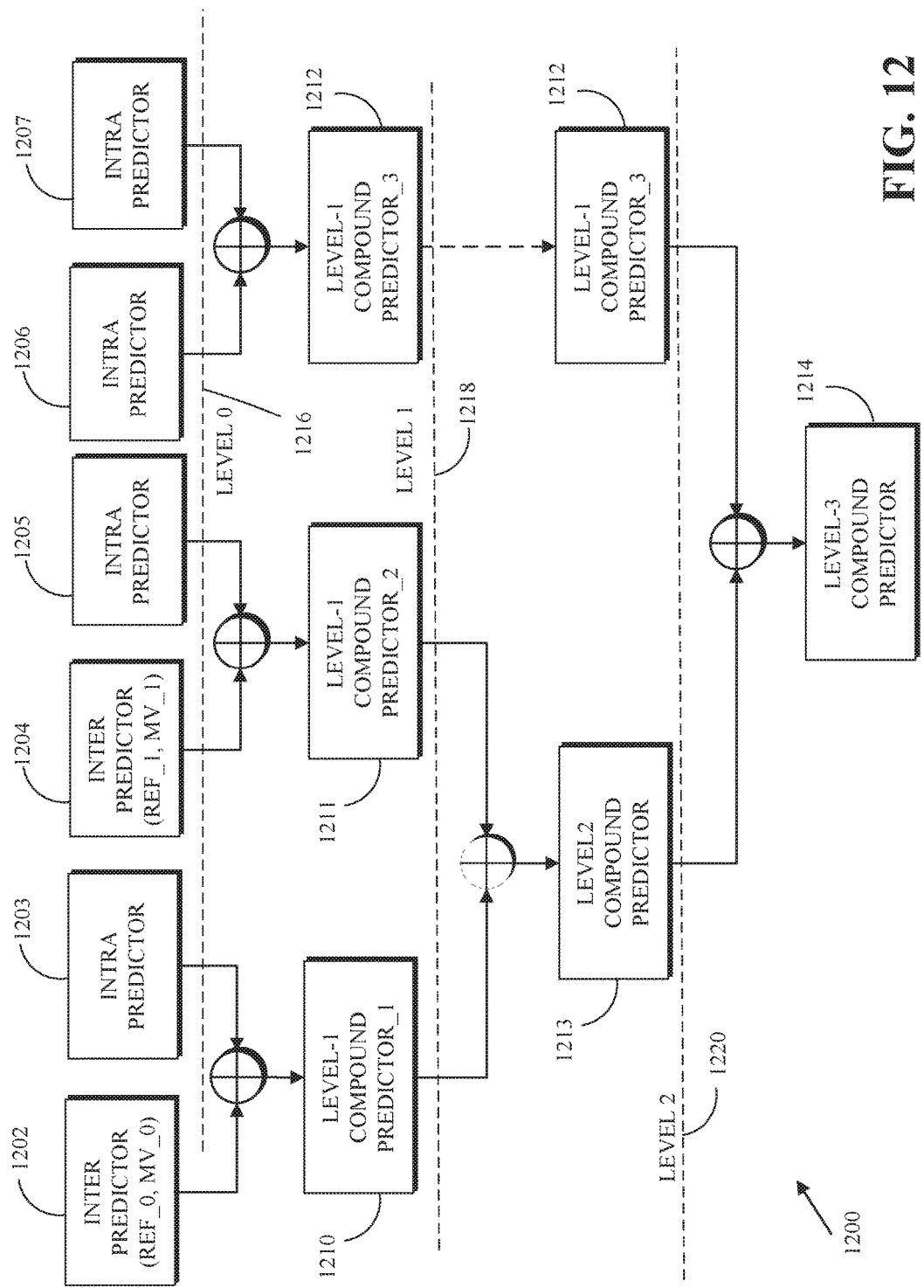
FIG. 12 is a diagram of a multi-level prediction according to implementations of this disclosure.

FIG. 12 is a diagram 1200 of a multi-level prediction according to implementations of this disclosure. FIG. 12 illustrates an example of a multi-level compound prediction. In this example, a level-3 compound predictor 1214 is generated at level-3. The level-3 compound predictor 1214 constitutes the prediction block of the current block At level 0, indicated by line 1216, the process 600 generates, at 602, at least two predictor blocks, namely an intra predictor 1206 and an intra predictor 1207, which are combined to form a first compound predictor, namely a level-1 compound predictor_3 1212.

As shown in the example of FIG. 12, the process 600 can also create, at level 1, a level-1 compound predictor_1 1210 (by combining an inter predictor 1202 and an intra predictor 1203) and a level-1 compound predictor_2 1211 (by combining an inter predictor 1204 and an intra predictor 1205). The level-1 compound predictor 1210 and the level-1 compound predictor-2 are combined to generate, at level 2 indicated by line 1220, a level-2 compound predictor 1213.

As the level-1 compound predictor_3 1212 is not combined with any other level 1 predictor block (compound or otherwise), it can be carried forward to level 2. Alternatively, the process 600 can generate the level-1 compound predictor_3 1212 at level 2 instead of at level 1.

At 604, the process 600 can generate any number of second predictors depending on a number of desired levels of compound prediction. For example, the level-1 compound predictor_1 1210, the level-1 compound predictor_2 1211, the level-1 compound predictor_3 1212, and the level-2 compound predictor 1213 can be second predictors.

At 606, the process 600 obtains the level-3 compound predictor 1214. As illustrated with respect to the diagram 1200, combining the first compound predictor and the second predictor can be accomplished via multiple intermediary levels.

Thus, the process 600 can create the prediction block of the current block in multiple levels. At level 0, one or more intra predictors and/or inter predictors are created. The level-0 predictors (e.g., the inter predictor 704 and the inter predictor 706 of FIG. 7) can be combined as described above to generate one or more level-1 compound predictors (e.g., the level-1 compound predictor 708 of FIG. 7). Some of the level-1 compound predictors (e.g., the level-1 compound predictor_0 1010 and level-1 compound predictor_1 of FIG. 10) can be combined to create one or more level-2 compound predictors (e.g., the level-2 compound predictor 1014 of FIG. 10). Depending on the number of desired levels, additional inter and/or intra predictors can be generated at a level-x (where x is greater than 0) (e.g., the inter predictor 710 of FIG. 7 and the inter predictor 910 of FIG. 9). These additional inter and/or intra predictors can be combined with the level-x compound predictors to generate level-(x+1) compound predictors (e.g., combining the level-1 compound predictor 708 and the inter predictor 710 to form the level-2 compound predictor 712 of FIG. 7).

While specific inter and intra predictors are shown in FIGS. 7 and 9-12 at the different levels, the disclosure is not so limited. Any inter, intra, or combinations of inter and intra predictors can be used at any level. For example, the inter predictor 706 of FIG. 7 can be an intra predictor, the inter predictor 910 of FIG. 9 can be an inter predictor, the intra predictor 1108 of FIG. 11 can be an inter predictor, and so on. Additionally, while compound predictors that combine two predictors are illustrated, the disclosure is not so limited.

A compound predictor can be obtained by combining any number of intra, inter, or compound predictors.

Additional ways of combining predictor blocks can be available. As disclosed herein or otherwise, various ways of combining predictor blocks (e.g., intra or inter predictor blocks such as the inter predictor 704 and the inter predictor 706) to generate a compound predictor, a compound predictor with another compound predictor (e.g., level-1 compound predictor_0 1010 with level-1 compound predictor-1 1012 of FIG. 10, or level-1 compound predictor_1 1210 with level-1 compound predictor_2 1211 of FIG. 12), a compound predictor with an intra or an inter predictor (e.g., the level-1 compound predictor 708 and the inter predictor 710 of FIG. 7), or any combination thereof, may be available.

Referring again to FIG. 7 as an illustrative example, implementations of determining the predictors for the multi-level compound prediction is described. The level-1 compound predictor 708 can be obtained by evaluating (i.e., searching for) motion vectors for pairs of reference frames until a best set of motion vectors of a pair of reference frames is obtained. All, or less than all, possible pairs of reference frames can be evaluated (i.e., searched). The one or more best motion vectors that form the set of motion vectors correspond to the best rate-distortion value. A rate-distortion value refers to a ratio that balances an amount of distortion (i.e., loss in video quality) with rate (i.e., the number of bits) used for encoding. In FIG. 7, the reference frames corresponding to the best motion vectors MV_0, MV_1 are determined to be reference frames 714 and 716.

The above search process can also identify, for the current block, motion vectors for the NEAREST_MV and NEAR_MV modes for at least some of the reference frames of the reference frame buffer 702. For each searched reference frame a best motion vector can be identified. The motion vectors for NEAREST_MV and NEAR_MV, and single motion vectors, can be added to the reference motion vector list of the current block.

For levels below level 0, a new motion search can be performed to determine the best motion vector and reference frame to generate the second predictor (e.g., inter predictor 710). Alternatively, the best single motion vector from the reference motion vector list of the current block (e.g., based on a lowest rate distortion value) can be used to generate the inter predictor 710. In FIG. 7, the reference frame 714 is the best single motion vector and can be used (as indicated by dashed line 726) to generate the inter predictor 710. In some embodiments, a per se rule may be established that the NEAREST_MV or NEAR_MV inter-prediction mode is used to generate an inter predictor for a next level, reducing the number of bits used to encode the motion vector information.

With either alternative (i.e., using the single motion vector or using NEAREST_MV or NEAR_MV), no new motion search is performed to generate the second predictor thereby reducing complexity. As such, information already identified (i.e., generated), while generating the level-1 compound predictor 708, can be used to generate multi-level compound predictors.

The process 600 can encode, in an encoded bitstream such as the compressed bitstream 420 of FIGS. 4 and 5, an indicator (e.g., one or more syntax elements) of a compound prediction type. A decoder, such as the decoder 500 of FIG. 5, can decode the indicator to determine, for example, the number of reference frames and motion frames to decode from the encoded bitstream in order for the decoder to perform multi-level compound prediction that can be identical to the motion prediction of the encoder. For example, the indicator can identify a tri-prediction or a quad-prediction compound prediction type. An indicator of quad-prediction can identify that the second predictor is a compound predictor. In another example, an indicator of tri-prediction can identify that the second predictor is not a compound predictor.

In either event, the indicator can be accompanied by syntax elements, encoded into the bitstream by the process 600, or after the process 600 is completed, that indicate the number of levels of multi-level compound prediction that the decoder is to perform and the prediction modes of each of the predictors. For example, and referring to FIG. 12, the encoder can indicate, via syntax elements, three levels of compound prediction, and that, at level 1, three compound predictors are to be generated: the first is an inter-intra compound predictor, the second is an inter-intra compound predictor, and the third is an intra-intra compound predictor. The encoder can encode additional information that can be used by the decoder. Such information can include identifiers of intra-prediction modes and/or identifiers of motion vectors and inter-prediction reference frames for the predictors forming the prediction block used to encode the current block.

Multi-level compound prediction can result in encoding additional bits in the encoded bitstream to generate the prediction block as compared to existing techniques. This can occur due to the need to encode syntax elements identifying multiple reference frames, multiple motion vectors and/or multiple intra prediction modes. The additional bits can outweigh the compression benefits of using multi-level compound prediction. Implementations of multi-level compound prediction can include steps or techniques that reduce the bitrate overhead while maintaining a reasonable level of encoder and decoder complexity.

In an example of reducing the bitrate overhead, performing and coding a new motion vector for an inter predictor at level-x (where x>0), both the encoder and the decoder can use the REF_MV mode of a reference frame to obtain an inter predictor. Further syntax can specify whether NEAREST_MV or NEAR_MV is to be used for inter prediction. As such, no motion vector need be written to the encoded bitstream for inter predictions in level-x (where x>0).

In another example of reducing the bitrate overhead, all inter predictions in the multi-level compound prediction may use a single inter prediction mode. For example, a special mode can be signaled by the encoder that indicates that all inter predictions in the multi-level compound prediction (e.g., when the indicator for multi-level compound prediction is present) use the NEAREST_MV mode.

Reducing the bitrate overhead may also be aided by coding the additional motion vectors more effectively. The motion vectors of the first compound predictor (e.g., the motion vectors corresponding to the inter predictors 704 and 706 of FIG. 7 or the motion vectors corresponding to the inter predictors 1002 and 1004 of FIG. 10) are known before the time of encoding of, e.g., a third or fourth motion vector for the multi-level compound prediction (e.g., the motion vector corresponding to the inter predictor 710 of FIG. 7 or the motion vectors corresponding to the inter predictors 1006 and 1008 of FIG. 10). As alluded to above, the motion vector(s) of the first compound predictor can be added to the reference motion vector list of candidate reference motion vectors. These motion vectors may provide a better motion vector reference for encoding the third and/or fourth motion vector(s) than NEAREST_MV or NEAR_MV. Where such a motion vector provides a better motion vector reference for encoding, more efficient encoding of the third and/or fourth motion vector(s) can result.

The coding of the reference frames can be more efficient, reducing the bitrate overhead, by improving the context used. In entropy coding (e.g., at the entropy encoding stage 408 or the entropy decoding stage 502), a context model may be used (also referred to as probability context model or probability model) that provides estimates of conditional probabilities for coding the symbols representing the transform coefficient. Previously coded data can be used a context for selecting the context model to encoding the current block. For example, an encoder can apply a specific context when a third reference frame is identical to either of the two reference frames of the first compound predictor. As another example, the encoder can signal a specific mode based on the reference frames used by the first compound predictor and the third and/or fourth reference frame corresponding to the third and/or fourth motion vector. For example, when the reference frame pair of the first compound predictor is a special pattern, e.g. {LAST_FRAME, BWDREF_FRAME}, and the third reference frame is LAST_FRAME, the encoder can so signal via syntax elements and no identifier of a reference need be encoded.

Figure 13:
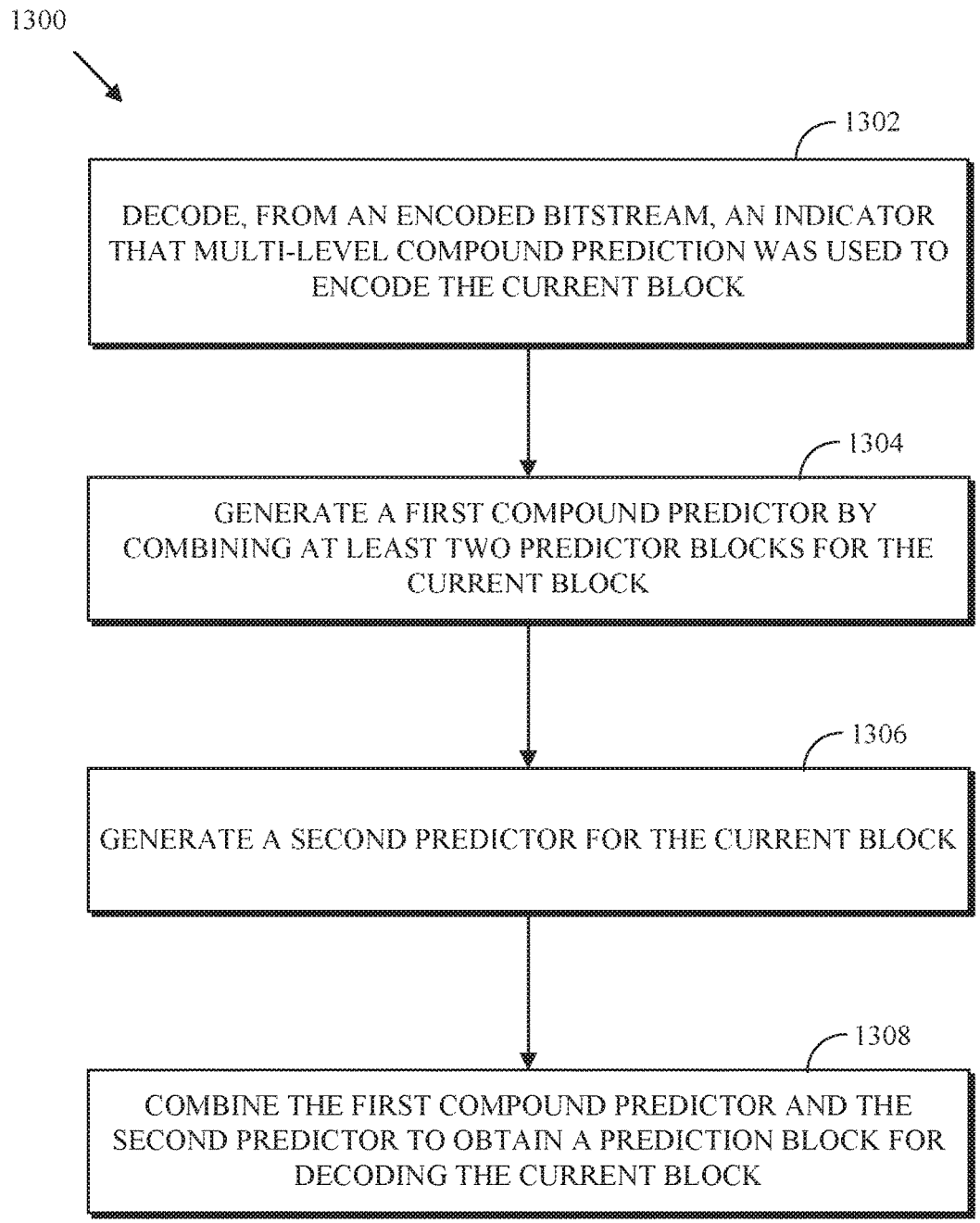
FIG. 13 is a flowchart diagram of a process for decoding a current block according to an implementation of this disclosure.

FIG. 13 is a flowchart diagram of a process 1300 for decoding a current block using multi-level compound prediction according to implementations of this disclosure. The process 1300 may be performed by a decoder. For example, the process 1300 can be performed in whole or in part by the intra/inter-prediction stage 508 of the decoder 500. The process 1300 can be performed in whole or in part during the reconstruction path (shown by the dotted connection lines) of the encoder 400 of FIG. 4. Implementations of the process 1300 can be performed by storing instructions in a memory such as the memory 204 of the receiving station 106, or the transmitting station 102, to be executed by a processor such as CPU 202, for example.

The process 1300 can be implemented using specialized hardware or firmware. Some computing devices can have multiple memories, multiple processors, or both. The steps or operations of the process 1300 can be distributed using different processors, memories, or both. For simplicity of explanation, the process 1300 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1302, the process 1300 decodes, from an encoded bitstream, an indicator that identifies that multi-level compound prediction was used to encode the current block. The indicator can be one or more syntax elements that directs the decoder to generate a prediction block for the current block using multi-level compound prediction. The indicator may be decoded from a frame header, a slice header, or a block header, for example. In some cases, the indicator may comprise syntax split between headers. For example, a frame level indicator may identify that at least some blocks in the frame using multi-level compound prediction, while a block level indicator identifies the type of multi-level compound prediction, along with the inter-prediction and/or intra-prediction modes used for the constituent predictor blocks of the current block. Motion vector and reference frame information may also be included.

At 1304, the process 1300 generates a first compound predictor for the current block by combining at least two predictor blocks for the current block. For example, the indicator can include syntax that identifies one or more reference frames and corresponding motion vectors, one or more intra-prediction modes, or any combination thereof, for each of the predictor blocks. Based on this information, the process 1330 can generate the first compound predictor such as the level-1 compound predictor 708 of FIG. 7, the level-1 compound predictor 908 of FIG. 9, the level-1 compound predictor_0 1010 of FIG. 10, the level-1 compound predictor_0 1110 of FIG. 11, and the like, by first generating the constituent predictors and combining them to form the first compound predictor based on the combination technique (such as the weights) used by the encoder. The combination technique can be decided a priori between the encoder and decoder, or can be signaled from the encoder to be decoded and used by the decoder.

At 1306, the process 1300 generates a second predictor for the current block. For example, the indicator may identify an intra-prediction mode or an inter-prediction mode for the second predictor. The process 1300 generates the second predictor using the identified prediction mode. The indicator may identify that the second predictor is inter predicted by the inclusion of a reference frame and/or a motion vector in the encoded bitstream.

In some cases, the indicator identifies that the second predictor is a compound predictor. That is, the second predictor is generated by combining at least two predictor blocks. If so, the process 1300 at 1306 can determine, from the encoded bitstream, the inter-prediction mode(s) and/or inter-prediction modes used, and generate the constituent predictor blocks before combining them to form the second predictor. The combining may be performed by an a priori decision between the encoder and decoder, by information signaled from the encoder to the decoder.

In some implementations, the inclusion of the indicator in the encoded bitstream can indicate to use NEAREST_MV for every inter-predicted predictor block in one or more levels. As such, the decoder does not receive a separate motion vector coding mode for those blocks. Additionally or alternatively, an a priori rule may be implemented that allows the decoder to determine the reference frame for a level-2 predictor based on one or more reference frames used for a level-1 predictor.

At 1308, the process 1300 combines the first compound predictor and the second predictor to obtain a prediction block for decoding the current block. The combination is made the same way as was done at the encoder.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coding, by a codec, a current block of a video stream, comprising:
   generating, by a prediction stage of the codec, a first compound predictor by combining at least two predictor blocks for the current block, wherein the first compound predictor is a first compound prediction block that combines one of two intra predictors, an intra predictor and an inter predictor, or two inter predictors;
   generating, by the prediction stage of the codec, a second predictor for the current block, wherein the second predictor is a second compound prediction block, the second compound predictor generated by combining at least two other predictor blocks for the current block; and
   combining, pixel-wise and by the prediction stage of the codec, the first compound predictor and the second compound predictor to obtain a prediction block for coding the current block.

2. The method of claim 1, wherein generating the second predictor comprises:
   generating the second predictor using inter prediction.

3. The method of claim 2, wherein generating the second predictor comprises:
   using a most likely motion vector for the current block (NEAREST_MV) to inter predict the current block.

4. The method of claim 1, wherein generating the second predictor comprises:
   generating the second predictor using intra prediction.

5. The method of claim 1, wherein the at least two predictor blocks comprises a first constituent predictor and a second constituent predictor, generating the first compound predictor comprises averaging pixels of the first constituent predictor with the second constituent predictor, and combining the first compound predictor and the second predictor comprises averaging pixels of the first compound predictor and the second predictor to obtain the prediction block for coding the current block.

6. The method of claim 1, further comprising:
   encoding, in an encoded bitstream, an indicator identifying whether the second predictor is a compound predictor.

7. The method of claim 1, further comprising:
   generating each of the at least two predictor blocks using inter prediction.

8. An apparatus for encoding a current block, the apparatus comprising:
   a memory; and
   a processor configured to execute instructions stored in the memory to:
      generate a first compound predictor by combining at least two predictor blocks for the current block, wherein the first compound predictor is a first compound prediction block that combines one of two intra predictors, an intra predictor and an inter predictor, or two inter predictors;
      generate, by combining at least two other predictor blocks for the current block, a second predictor for the current block; and
      combine, pixel-wise, the first compound predictor and the second predictor to obtain a prediction block for encoding the current block.

9. The apparatus of claim 8, wherein the at least two other predictor blocks comprise a first constituent predictor generated using intra prediction and a second constituent predictor generated using inter prediction.

10. The apparatus of claim 8, wherein the instructions to generate the second predictor comprise instructions to:
generate the second predictor by inter predicting the current block using a most likely motion vector for the current block (NEAREST_MV).

11. The apparatus of claim 8, wherein the second predictor is a second intra predictor.

12. The apparatus of claim 8, wherein the at least two protector blocks comprise a first constituent predictor and a second constituent predictor, the first constituent predictor is generated using a first adjacent frame as a first reference frame in inter prediction of the current block and the second constituent predictor is generated using a second adjacent frame in inter prediction of the current block, the first adjacent frame immediately before a current frame in which the current block is located in a video sequence and the second adjacent frame immediately before the first adjacent frame in the video sequence, and the second predictor is generated using the first adjacent frame as a second reference frame in inter prediction of the current block.

13. An apparatus for decoding a current block, the apparatus comprising:
a memory; and
a processor configured to execute instructions stored in the memory to:
decode, from an encoded bitstream, an indicator that identifies that multi-level compound prediction was used to encode the current block;
generate a first compound predictor by combining at least two predictor blocks for the current block, wherein the first compound predictor is a first compound prediction block that is generated by combining two intra predictors, an intra predictor and an inter predictor, or two inter predictors;
generate, by combining at least two other predictor blocks for the current block, a second predictor for the current block; and
combine, pixel-wise, the first compound predictor and the second predictor to obtain a prediction block for decoding the current block.

14. The apparatus of claim 13, wherein the indicator identifies whether or not the second predictor is a compound predictor block.

15. The apparatus of claim 13, wherein the instructions to combine the first compound predictor and the second predictor comprise instructions to average co-located pixels of the first compound predictor and the second predictor to obtain the prediction block for coding the current block.

16. The apparatus of claim 13, wherein the indicator identifies a prediction mode for each of the at least two predictor blocks.

17. The apparatus of claim 16, wherein the at least two predictor blocks comprise a first inter predictor and a second inter predictor, and wherein the instructions comprise instructions to use a same inter-prediction mode for each of the first inter predictor, the second inter predictor, and the second predictor.

18. The apparatus of claim 13, wherein the instructions to generate the first compound predictor comprise instructions to average co-located pixels of the at least two predictor blocks to generate the first compound predictor.

* * * * *